US010279660B2

(12) United States Patent
Nomura et al.

(10) Patent No.: US 10,279,660 B2
(45) Date of Patent: May 7, 2019

(54) WINDOW COVER FOR AUTOMOBILE

(71) Applicant: HONDA ACCESS CORP., Niiza-shi, Saitama (JP)

(72) Inventors: Tadashi Nomura, Niiza (JP); Daisuke Watanabe, Niiza (JP)

(73) Assignee: HONDA ACCESS CORP., Niiza-shi (JP)

( * ) Notice: Subject to any disclaimer, the term of this patent is extended or adjusted under 35 U.S.C. 154(b) by 490 days.

(21) Appl. No.: 14/311,450

(22) Filed: Jun. 23, 2014

(65) Prior Publication Data
US 2015/0013862 A1 Jan. 15, 2015

(30) Foreign Application Priority Data
Jul. 9, 2013 (JP) .................... 2013-143601

(51) Int. Cl.
B60J 3/00 (2006.01)
B60J 1/20 (2006.01)
B60J 11/08 (2006.01)

(52) U.S. Cl.
CPC ............. B60J 1/2094 (2013.01); B60J 11/08 (2013.01)

(58) Field of Classification Search
CPC ............. B60J 11/08; B60J 1/2011; B60J 1/06
USPC .............. 150/168, 166, 154; 296/95.1, 97.7; D12/191, 401
See application file for complete search history.

(56) References Cited

U.S. PATENT DOCUMENTS

| 2,979,129 | A |   | 4/1961 | Ketchum |             |
|-----------|---|---|--------|---------|-------------|
| 3,336,969 | A | * | 8/1967 | Marchman | ...... B60J 11/08 |
|           |   |   |        |         | 160/370.21  |
| 5,014,758 | A | * | 5/1991 | Stinson  | ...... B60J 11/08 |
|           |   |   |        |         | 150/168     |

(Continued)

FOREIGN PATENT DOCUMENTS

FR 1332703 A 7/1963
JP 11-151940 A 6/1999
(Continued)

OTHER PUBLICATIONS

European Search Report dated Nov. 17, 2014, issued in corresponding European Application No. 14173918 (2 pages).
(Continued)

Primary Examiner — Fenn C Mathew
Assistant Examiner — Cynthia F Collado
(74) Attorney, Agent, or Firm — Westerman, Hattori, Daniels & Adrian, LLP

(57) ABSTRACT

A window cover for an automobile integrally includes: a front sheet to cover an outer surface of an automobile windshield; and a pair of side sheets to cover outer surfaces of left and right front door glasses, respectively. The side sheets are fixed to a vehicle body by a fixing device. The device includes a plate-shaped tab fixed to a rear edge of each side sheet. The tab is fixed by being inserted into a clearance between a rear edge of each of the front door glasses and a front edge of a rear door glass of a rear door placed rearward of the rear edge. Accordingly, convenience is improved because the cover can be easily attached to the vehicle body with the front and rear doors remaining closed, and workability is not deteriorated because the cover is not twisted or entwined when the front doors are opened or closed.

5 Claims, 4 Drawing Sheets

(56) References Cited

U.S. PATENT DOCUMENTS

| | | | | |
|---|---|---|---|---|
| 5,615,923 A * | 4/1997 | Madison | ............ | B60J 11/08 |
| | | | | 160/370.21 |
| 6,015,180 A * | 1/2000 | Beuerle | ............ | B60J 11/08 |
| | | | | 150/168 |
| 6,076,577 A * | 6/2000 | Ontaneda | ............ | B60J 11/08 |
| | | | | 150/168 |
| 6,241,303 B1 * | 6/2001 | Yee | ............ | B60J 11/08 |
| | | | | 150/168 |
| 6,648,396 B2 * | 11/2003 | Monahan | ............ | B60J 1/2011 |
| | | | | 160/370.21 |
| 7,219,616 B2 * | 5/2007 | Pritchett | ............ | B63B 17/02 |
| | | | | 114/361 |
| 2014/0261934 A1 * | 9/2014 | Abeyta | ............ | B60J 11/08 |
| | | | | 150/168 |
| 2015/0013861 A1 * | 1/2015 | Ein | ............ | B60J 11/08 |
| | | | | 150/168 |
| 2015/0114533 A1 * | 4/2015 | Peries | ............ | B60J 11/08 |
| | | | | 150/168 |

FOREIGN PATENT DOCUMENTS

| | | | |
|---|---|---|---|
| JP | 2000-118245 A | | 4/2000 |
| JP | 2000-142122 A | | 5/2000 |
| JP | 2000142122 A | * | 5/2000 |
| JP | 2001-80367 A | | 3/2001 |
| JP | 2010-260530 A | | 11/2010 |
| WO | 99/44850 A1 | | 9/1999 |

OTHER PUBLICATIONS

Japanese Office Action dated Jan. 14, 2015, issued in corresponding Japanese Patent Application No. 2013-143601(4 pages).

\* cited by examiner

WINDOW COVER FOR AUTOMOBILE

BACKGROUND OF THE INVENTION

Field of the Invention

The present invention relates to a window cover for an automobile comprising: a front sheet to cover an outer surface of an automobile windshield; and a pair of side sheets to cover outer surfaces of left and right front door glasses, respectively, the front sheet and the pair of side sheets being integrated together, in which the pair of side sheets are fixed to a vehicle body by use of a fixing device.

Description of the Related Art

When an automobile is left outdoors overnight in a cold region or the like, frost may adhere to an outer surface of a windshield and outer surfaces of left and right front door glasses the next morning and obstruct a field of view of a driver. As a consequence, the driver may not be able to start driving the automobile until the frost melts off.

To solve such inconvenience, Japanese Patent Application Laid-open No. 2000-118245 and No. 11-151940 have made publicly known window covers which are configured to prevent frost from adhering to the outer surface of the windshield as well as the outer surfaces of the left and right front door glasses of the automobile by detachably covering them.

SUMMARY OF THE INVENTION

The cover described in Japanese Patent Application Laid-open No. 2000-118245 is a sheet-shaped cover which is designed to be fixed to positions which enable the cover to cover the outer surface of the windshield as well as the outer surfaces of the left and right front door glasses by: attaching column-shaped stopper members, respectively, to the cover's left and right rear end portions covering the outer surfaces of the left and right front door glasses by use of sheet pieces; closing the front doors with the stopper members placed inside the vehicle compartment; and thereby holding the sheet pieces between the respective doors and the vehicle body. The design of the cover, however, makes it difficult for an occupant to perform, from outside the vehicle compartment, the manipulation of holding the sheet pieces between the respective doors and the vehicle body with the stopper members placed inside the vehicle compartment. Furthermore, when the occupant performs the manipulation from inside the vehicle compartment, the occupant has to get out of the vehicle compartment from a rear door, after finishing the manipulation. These pose a problem that convenience is extremely impaired.

The cover described in Japanese Patent Application Laid-open No. 11-151940 is a sheet-shaped cover which is designed to be fixed to positions which enable the cover to cover the outer surface of the windshield as well as the outer surfaces of the left and right front door glasses by: providing a pair of upper and lower attachment tube portions to each of the cover's left and right rear end portions covering the outer surfaces of the left and right front door glasses; fixing one ends of clips to the attachment tube portions, respectively, and holding the other ends of the clips between the door sashes and the door glasses; and thereafter closing the doors. This cover, however, requires the doors to be closed after the cover is attached with the doors being open. This poses a problem of deterioration in workability because the cover may get twisted or entwined when the doors are opened or closed.

The present invention has been made with the foregoing situations taken into consideration. An object of the present invention is to provide a window cover for an automobile which can be easily attached to a vehicle body.

In order to achieve the object, according to a first aspect of the present invention, there is provided a window cover for an automobile comprising: a front sheet to cover an outer surface of an automobile windshield; and a pair of side sheets to cover outer surfaces of left and right front door glasses, respectively, the front sheet and the pair of side sheets being integrated together, in which the pair of side sheets are fixed to a vehicle body by use of a fixing device, wherein the fixing device includes a plate-shaped tab fixed to a rear edge of each of the pair of side sheets, and the tab is fixed by being inserted into a clearance between a rear edge of each of the left and right front door glasses and a front edge of a vehicle body member placed rearward of the rear edge.

According to the configuration of the first aspect, the window cover for an automobile includes: the front sheet to cover the outer surface of the automobile windshield; and the pair of side sheets to cover the outer surfaces of the left and right front door glasses, respectively. The front sheet and the pair of side sheets are integrated together. The pair of side sheets are fixed to the vehicle body by use of the fixing device. The fixing device includes the plate-shaped tab fixed to the rear edge of each of the pair of side sheets. The tab is fixed by being inserted into the clearance between the rear edge of each of the front door glasses and the front edge of the vehicle body member placed rearward of the rear edge. For this reason, not only is convenience improved because the window cover can be easily attached to the vehicle body with the front doors remaining closed, but also workability is not deteriorated because the window cover is not twisted or entwined when the front doors are opened or closed.

According to a second aspect of the present invention, in addition to the first aspect, with the pair of side sheets covering the outer surfaces of the left and right front door glasses, the tab is integrally sewn to the rear edge of each of the pair of side sheets such that the tab is oriented forward.

According to the configuration of the second aspect, with the pair of side sheets covering the outer surfaces of the left and right front door glasses, the tab is integrally sewn to the rear edge of each of the pair of side sheets such that the tab is oriented forward. Thus, even when the window cover is pulled by gravity or wind, the tab is less likely to come off the clearance, and the widow cover can be stably fixed.

According to a third aspect of the present invention, in addition to the first or second aspect, as said tab, a plurality of tabs are provided to the rear edge of each of the side sheets, an uppermost one of the tabs is inserted into the clearance at an upper end of the rear edge of each front door glass, and a lowermost one of the tabs is inserted into the clearance at a lower end of the rear edge of the front door glass.

According to the configuration of the third aspect, the multiple tabs are provided to the rear edge of each side sheet; the uppermost-placed tab is inserted into the clearance at the upper end of the rear edge of each front door glass; and the lowermost-placed tab is inserted into the clearance at the lower end of the rear edge of the front door glass. For this reason, each side sheet can be put along and closely cover the outer surface of the corresponding front door glass. In addition, no tab hinders the window cover from being compactly folded and stored.

According to a fourth aspect of the present invention, in addition to the first or second aspect, a corner portion at a front end of each tab in its insertion direction has an obtuse angle.

According to the configuration of the fourth aspect, the corner portion at the front end of the tab in its insertion direction has the obtuse angle. For this reason, not only is the tab less likely to be caught when the tab is inserted into the clearance, but also the vehicle body can be prevented from damage by the tab.

It should be noted that a rear door glass 15 of an embodiment corresponds to the vehicle body member of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

Descriptions will be hereinbelow provided for an embodiment of the present invention on the basis of FIGS. 1 to 4.

Figure 1:
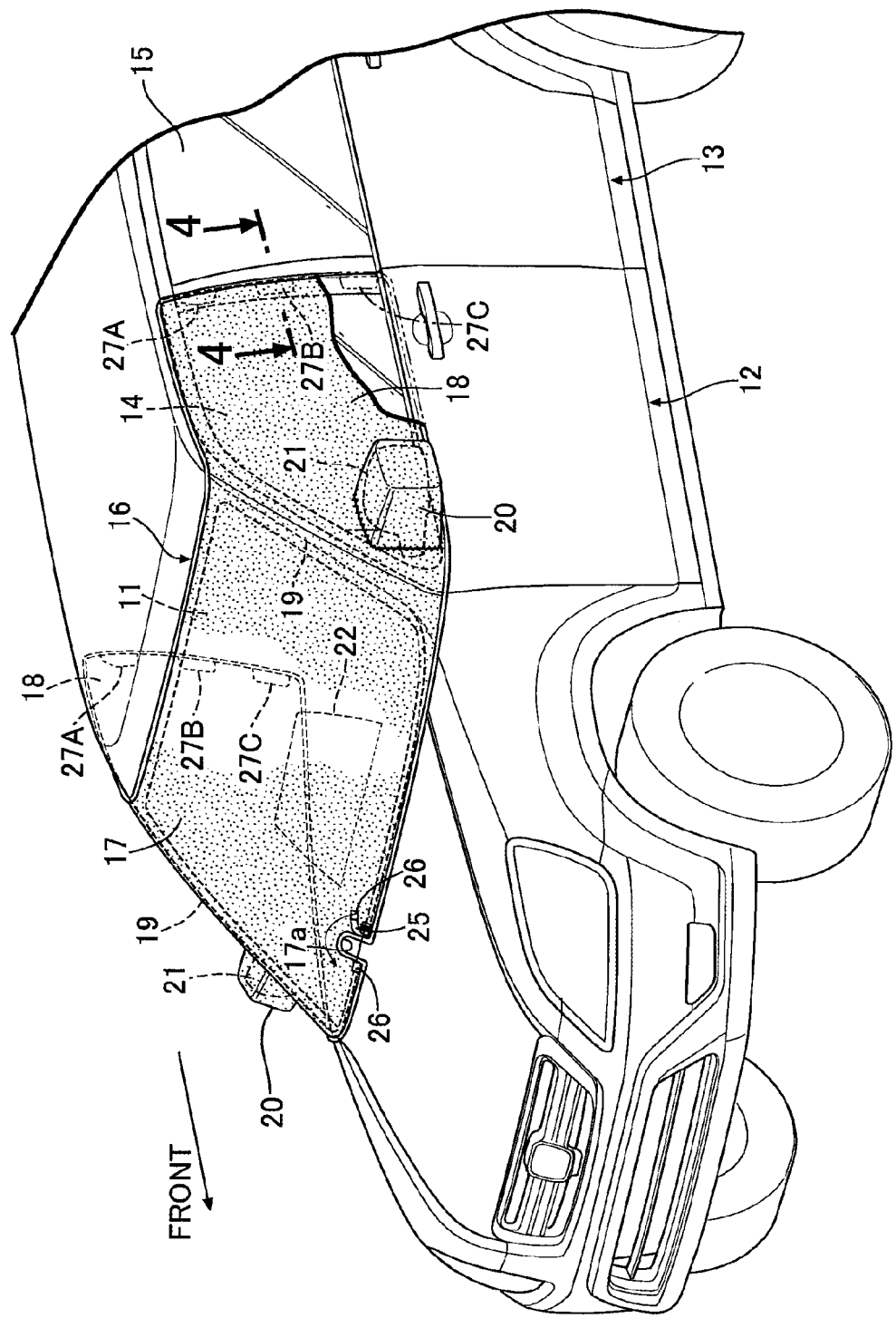
FIG. 1 is a perspective view of a vehicle body front portion of an automobile to which a window cover is attached.
Figure 2:
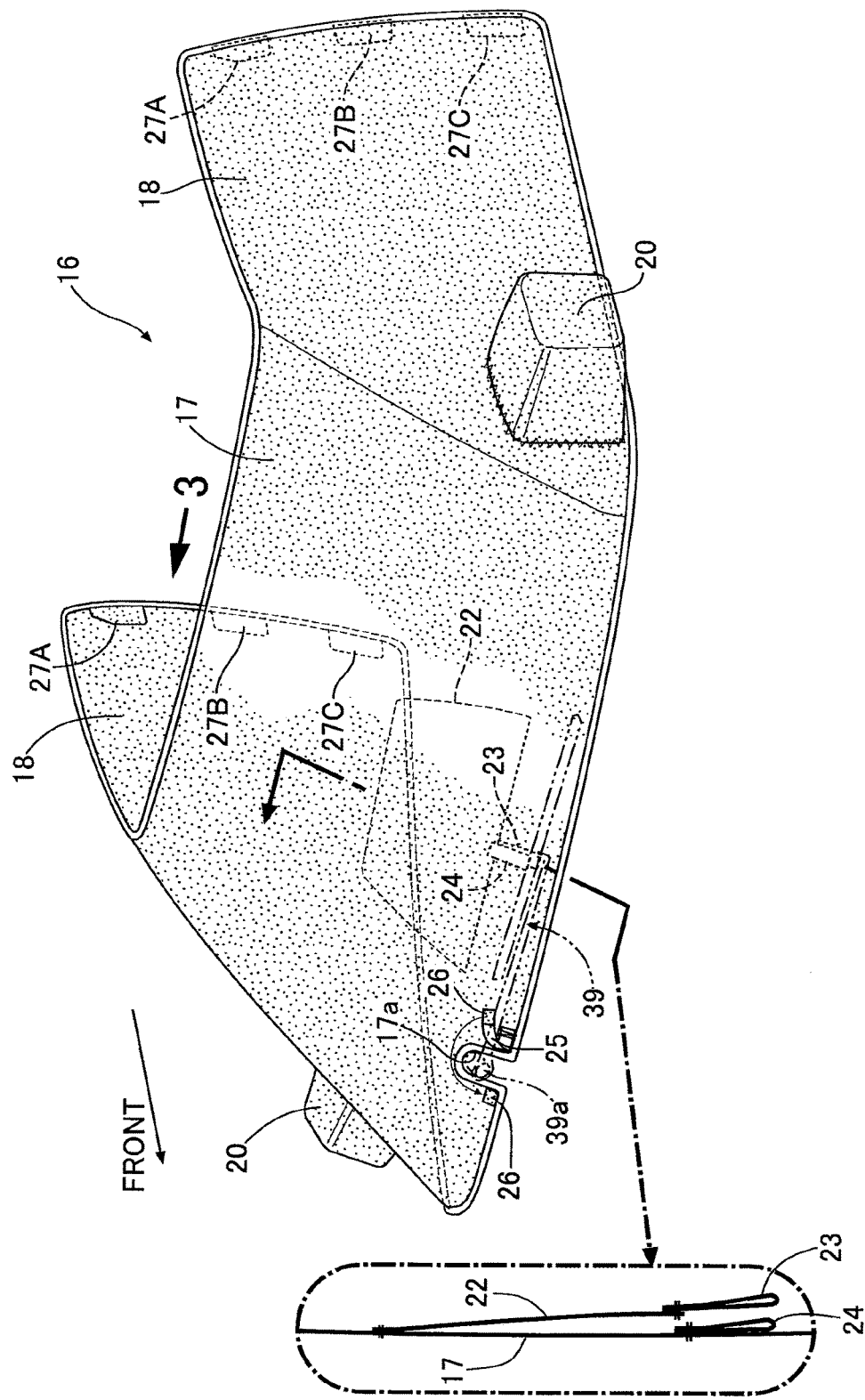
FIG. 2 is a perspective view of the window cover.

As shown in FIGS. 1 and 2, a windshield 11 is provided in a front surface of a vehicle compartment of an automobile. A front door glass 14 and a rear door glass 15 are provided respectively to upper portions of a front door 12 and a rear door 13 which are arranged in each of left and right side surfaces of the vehicle compartment. A window cover 16 for covering an outer surface of the windshield 11 as well as outer surfaces of the left and right front door glasses 14 is a belt-shaped waterproof sheet made of vinyl. The window cover 16 includes: a front sheet 17 for covering the windshield 11; and a pair of side sheets 18 for covering the left and right front door glasses 14. The left and right side sheets 18 are connected to the front sheet 17 at positions along left and right front pillars 19, respectively. Accordingly, the front sheet 17 is formed in a substantially rectangular shape, while the left and right side sheets 18 are formed in a substantially trapezoidal shape.

Pouch-shaped door mirror container portions 20 are provided in front lower corner portions of the side sheets 18, respectively. Door mirrors 21 provided to the respective front doors 12 are covered with the door mirror container portions 20. A container bag 22 obtained by sewing three sides of its quadrilateral sheet is provided on a back surface of the front sheet 17 (which is a surface to come into contact with the windshield 11). One handle 23 is attached to a lower edge of the container bag 22 along which the container bag 22 is opened. Another handle 24 paired with the handle 23 is sewed on the back surface of the front sheet 17. In addition, a U-shaped recessed portion 17a is formed in a lower edge of the front sheet 17. A tongue piece 25 is provided to the lower edge of the front sheet 17 in a way to close the recessed portion 17a. One end of the tongue piece 25 is sewed on the front sheet 17, while the other end of the tongue piece 25 is openable and closable with a hook-and-loop fastener 26.

Figure 3:
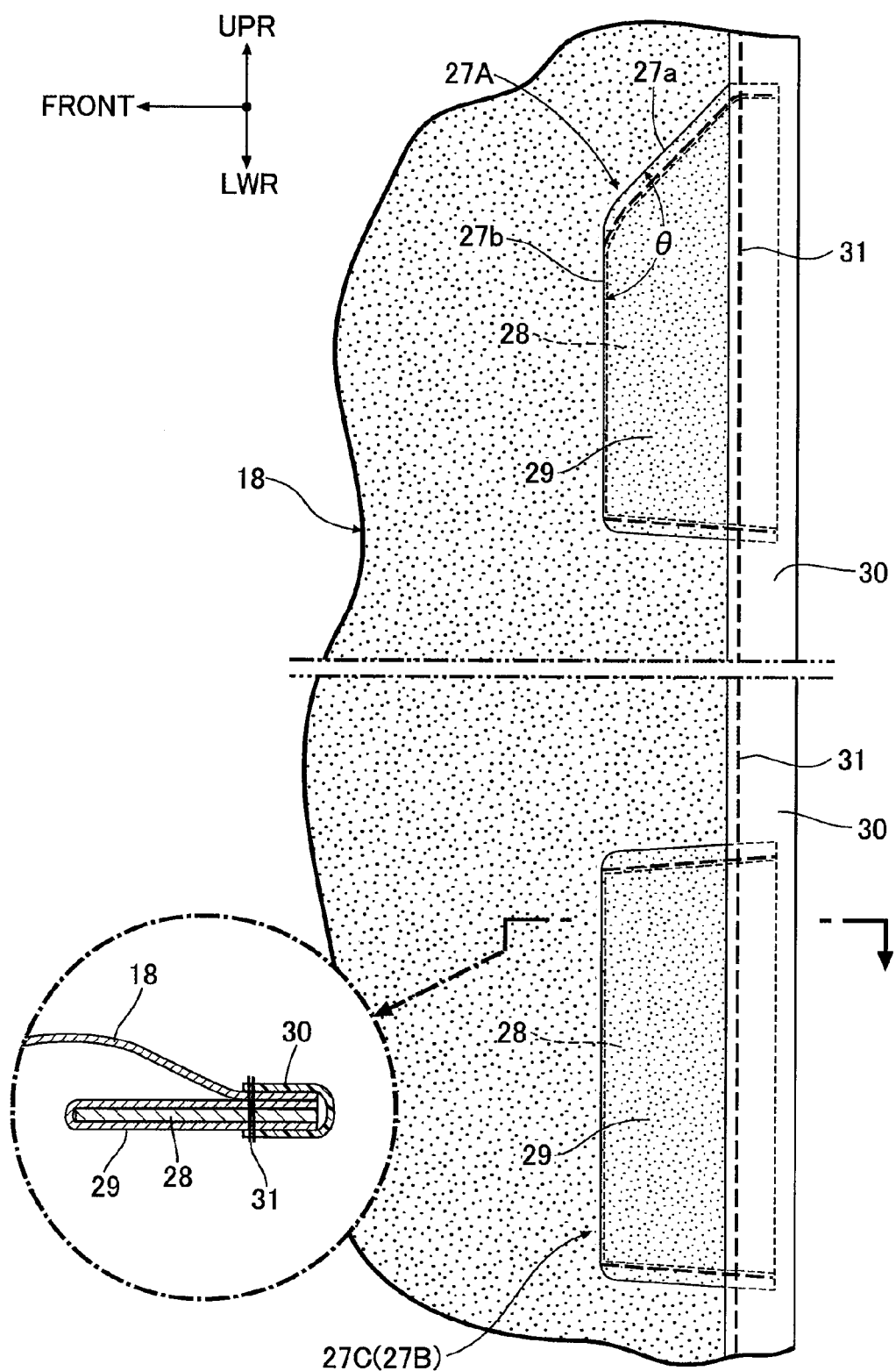
FIG. 3 is an enlarged view taken in a direction of an arrow 3 in FIG. 2.

As is clear from FIGS. 2 and 3, three tabs 27A, 27B, 27C are provided in each of rear edges of the side sheets 18 which extend along rear edges of the front door glasses 14 when the window cover 16 is attached to the vehicle body. Each of the three tabs 27A, 27B, 27C is a square-cut synthetic-resin plate member 28 covered with a sheet piece 29. Each of the tabs 27A, 27B, 27C is fixed to the rear edge of the corresponding side sheet 18 by sewing 31 with its base end portion overlapping the rear edge of the side sheet 18, and with a double-folded belt-shaped sheet piece 30 overlapping the base end portion and the rear edge of the side sheet 18 from outside. In this state, the three tabs 27A, 27B, 27C overlap a back surface of each side sheet 18, and their extremities extend frontward.

Of the three tabs 27A, 27B, 27C, the tab 27B in the center in an up-down direction and the tab 27C on a lower side in the up-down direction are each formed in a substantially rectangular shape. The tab 27A on an upper side in the up-down direction has an upper edge 27a which inclines frontward and downward so that an angle between the upper edge 27a and a front edge 27b is an obtuse angle θ.

Figure 4:
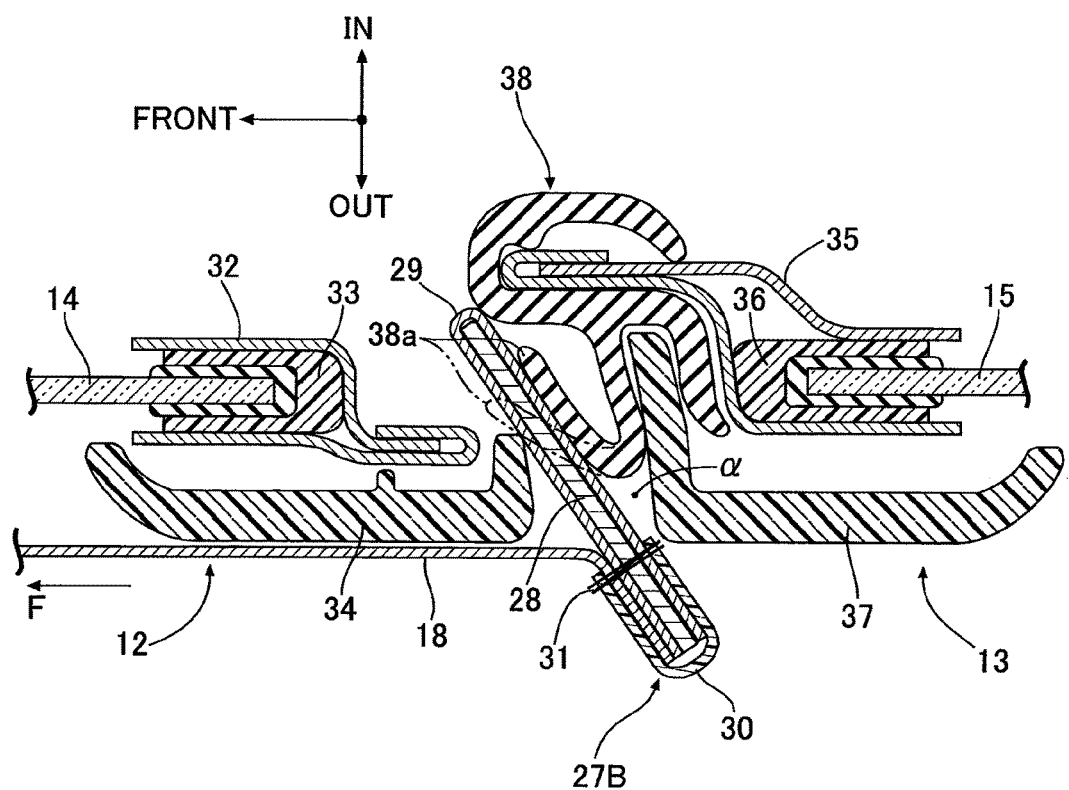
FIG. 4 is an enlarged sectional view taken along a line 4-4 in FIG. 1.

As shown in FIG. 4, a rear edge of the front door glass 14 is supported slidably upward and downward by a run channel 33 held by a door sash 32 at a rear edge of the front door 12. An outer surface of the door sash 32 in a vehicle-width direction is covered with a garnish 34. In addition, a front edge of the rear door glass 15 is supported slidably upward and downward by a run channel 36 held by a door sash 35 at a front edge of the rear door 13. An outer surface of the door sash 35 in the vehicle-width direction is covered with a garnish 37. A rubber-made weather strip 38 for blocking intrusion of rainwater is attached to the door sash 35 and the garnish 37 of the rear door 13. A lip 38a of the weather strip 38 is in contact with a rear edge of the garnish 34 of the front door 12, and seals a clearance a between the front door glass 14 and the rear door glass 15.

Next, descriptions will be provided for an operation of the embodiment of the present invention having the forgoing configuration.

Attachment of the window cover 16 to the vehicle body is achieved in the following manner. The front sheet 17 of the window cover 16 which is unfolded is put along the outer surface of the windshield 11. The left and right side sheets 18 are put along the outer surfaces of the front door glasses 14 of the front doors 12, respectively. The left and right door mirrors 21 are covered with the door mirror container portions 20 which are provided to the left and right side sheets 18, respectively. In this state, the tabs 27A, 27B, 27C provided along the rear edge of each side sheet 18 are inserted into the clearance a between the front door glass 14 and the rear door glass 15, and are further inserted into an interstice between the lip 38a of the weather strip 38 and the rear edge of the garnish 34 of the front door 12 while pushing the lip 38a open rearward. Thereafter, the recessed portion 17a in the lower edge of the front sheet 17 is engaged with a shaft portion 39a of a wiper 39 (see FIG. 2). With the shaft portion 39a held between the recessed portion 17a and the tongue piece 25, the tongue piece 25 is fixed to the front sheet 17 by use of the hook-and-loop fastener 26.

Once the window cover 16 is attached in this manner, the left and right side sheets 18 are pulled toward a front side of the vehicle body by tensile force F of the window cover 16 (see FIG. 4). Since, however, the tabs 27A, 27B, 27C are inserted obliquely toward the front side of the vehicle body, the tensile force F acts on the tabs 27A, 27B, 27C in a way to pull them into the clearance a. Thereby, it is possible to prevent the tabs 27A, 27B, 27C from coming off, and to firmly fix the window cover 16. Furthermore, since the left and right door mirrors 21 are respectively covered with the door mirror container portions 20 of the side sheets 18, front portions of the side sheets 18 are supported by the door mirrors 21. Thereby, it is possible to prevent the window cover 16 from sliding down due to the gravity, and from being turned up by wind. Moreover, since the lower edge of the front sheet 17 is fixed to the shaft portion 39a of the wiper 39 by use of the recessed portion 17a and the tongue piece 25, it is possible to more securely prevent the window cover 16 from being turned up by wind.

Since as described above, the window cover 16 can be attached to the vehicle body with the front doors 12 and the rear doors 13 remaining closed, without opening or closing any of the front doors 12 and the rear doors 13, not only can the attachment work be carried out easily, but also workability does not deteriorate because the window cover 16 does not get twisted or entangled when the front doors 12 are opened and closed. In addition, since the thin plate-shaped tabs 27A, 27B, 27C are inserted and fixed between the weather strip 38 and the garnish 34 by elastically deforming the weather strip 38, elasticity of the weather strip 38 makes the tabs 27A, 27B, 27C less likely to come off, and makes it possible to block the intrusion of rainwater while minimizing deformation of the weather strip 38.

If, instead, a single tab would be provided extending from an upper end through a lower end of the rear edge of each side sheet 18, it would be difficult to fold the window cover 16 compactly because the single tab hinders the folding of the window cover 16. In contrast, the three divided tabs 27A, 27B, 27C, the upper, middle and lower ones, make it easy to fold the window cover 16; and the tabs 27A, 27C respectively at the upper and lower ends enable each side sheet 18 to be put along and closely cover the outer surface of the corresponding front door glass 14. Furthermore, when the tabs 27A, 27B, 27C are inserted, since the tab 27A at the upper end in particular is inserted with its upper edge 27a sliding along the garnish 34 at an upper edge of the front door glass 14, the corner portion may be caught by the garnish 34 and, thereby smooth insertion of the tab 27A may be obstructed. However, since the corner portion is set to have the obtuse angle θ (see FIG. 3), not only can the tab 27A at the upper end be inserted smoothly, but also the vehicle body can be prevented from damage by the tab 27A.

When the window cover 16 is detached, it is very easy to conduct detaching work since it is only necessary to pull the tabs 27A, 27B, 27C out of the clearance a between the front door glass 14 and the rear door glass 15 while keeping the front door 12 and the rear door 13 closed. In addition, the detached window cover 16 can be compactly contained inside the container bag 22 by: folding the window cover 16 from its periphery toward the container bag 22 on the front sheet 17; and thereafter turning the container bag 22 inside out. The folded window cover 16 is easy to carry since the handles 23, 24 are provided to the container bag 22.

Although the foregoing descriptions have been provided for the embodiment of the present invention, various design changes can be made to the present invention within the scope not departing from the gist of the present invention.

For example, although in the embodiment, each side sheet 18 includes the three tabs 27A, 27B, 27C, the number of tab is arbitrary.

Furthermore, although in the embodiment, the tabs 27A, 27B, 27C are inserted into the clearance a between the garnish 34 of the front door 12 and the garnish 37 of the rear door 13, the tabs 27A, 27B, 27C may be directly inserted into the clearance a between the front door glass 14 and the rear door glass 15 in a case of a pillarless automobile having no garnishes or door sashes.

Moreover, in a case of an automobile having no rear doors, the tabs 27A, 27B, 27C may be inserted into a clearance between the door sash 32 of the front door glass 14 (or the front door glass 14 itself) and a rear quarter glass. In a case of an automobile having an exposed center pillar, the tabs 27A, 27B, 27C may be inserted into a clearance between the door sash 32 of the front door glass 14 (or the front door glass 14 itself) and the center pillar.

In addition, intended use of the window cover for an automobile of the present invention is not limited to frost protection, and is applicable to sunlight protection and snow protection.

What is claimed is:
1. A window cover for an automobile comprising:
a front sheet to cover an outer surface of an automobile windshield; and
a pair of side sheets to cover outer surfaces of left and right front door glasses, respectively, the front sheet and the pair of side sheets being integrated together, in which the pair of side sheets are configured to be fixed to a vehicle body by use of a fixing device,
wherein the fixing device includes a plate-shaped tab fixed to a rear edge of each of the pair of side sheets,
wherein with the pair of side sheets covering the outer surfaces of the left and right front door glasses, the tab is integrally sewn to the rear edge of each of the pair of side sheets such that the tab is configured to be oriented forward when fixed to the vehicle,
wherein the tab is configured to be fixed by either (i) the tab being inserted into a clearance between a rear edge of each of the left and right front door glasses and a front edge of a vehicle body member placed rearward of the rear edge, (ii) the tab being inserted into a clearance between a rear edge of a door sash at each of the left and right front door glasses and the front edge of the vehicle body member, or (iii) the tab being inserted into a clearance between a rear edge of a door garnish of each of the left and right front doors and the front edge of the vehicle body member, and
wherein the plate-shaped tab is fixed to the rear edge of the corresponding side sheet by sewing such that a rear base end portion of the tab overlaps the rear edge of the side sheet, a double-folded belt-shaped sheet piece overlaps both of the rear base end portion of the tab and the rear edge of the side sheet from outside, respectively, and the rear base end portion of the tab, the rear edge of the side sheet and the double-folded belt-shaped sheet piece are sewn together at mutually overlapped portions of the tab, the side sheet and the double-folded belt-shaped sheet piece.

2. The window cover for an automobile according to claim 1,
wherein as said tab, a plurality of tabs are provided to the rear edge of each of the side sheets,
wherein an uppermost one of the tabs is configured to be inserted into the clearance at a position around an upper end of the rear edge of each front door glass, and
wherein a lowermost one of the tabs is configured to be inserted into the clearance at a position around a lower end of the rear edge of the front door glass.

3. The window cover for an automobile according to claim 1, wherein a corner portion at a front end of each tab in its insertion direction has an obtuse angle.

4. The window cover for an automobile according to claim 1, wherein the vehicle body member is a rear garnish of a rear door or a rear door glass or is a center pillar or a rear quarter glass.

5. The window cover for an automobile according to claim 1, wherein the tab is sewn to the rear edge of the side sheets such that a base end portion of the tab overlaps on the rear edge of the side sheet, with mating faces of the base end portion of the tab and the rear edge of the side sheet in contact with each other.

\* \* \* \* \*